United States Patent [19]

Carmichael et al.

[11] Patent Number: 5,098,010

[45] Date of Patent: Mar. 24, 1992

[54] PROCESS USING PROTECTIVE FLUX COATINGS FOR DELAYING JOINING AND SOLDERING OPERATIONS

[76] Inventors: Arthur O. Carmichael, 7830 Barnsbury, Union Lake, Mich. 48085; Seymour A. Genden, 15100 Dartmouth, Oak Park, Mich. 48237

[21] Appl. No.: 101,941

[22] Filed: Sep. 28, 1987

Related U.S. Application Data

[62] Division of Ser. No. 8,853, Jan. 30, 1987, abandoned.

[51] Int. Cl.[5] .............................................. B23K 1/20
[52] U.S. Cl. ................................... 228/223; 148/23; 228/207; 228/214
[58] Field of Search ....................... 228/207, 214, 223; 148/23, 25

[56] References Cited

U.S. PATENT DOCUMENTS

| | | | |
|---|---|---|---|
| 3,602,979 | 9/1971 | Lalacona | 228/207 |
| 3,728,783 | 4/1973 | Chartet | 228/207 |
| 3,894,674 | 7/1975 | Weill | 228/207 |
| 3,937,387 | 2/1976 | Fletcher et al. | 228/214 |
| 3,960,614 | 6/1976 | Stayner | 148/23 |
| 4,028,143 | 6/1977 | Stayner et al. | 148/23 |
| 4,055,725 | 10/1977 | Boynton | 174/68.5 |
| 4,127,692 | 11/1978 | Boynton | 428/137 |
| 4,395,294 | 7/1983 | Hobbins et al. | 228/214 |
| 4,523,712 | 6/1985 | Zado | 228/207 |

FOREIGN PATENT DOCUMENTS 312712 6/1971 U.S.S.R. ............... 228/207

*Primary Examiner*—Kurt Rowan
*Attorney, Agent, or Firm*—Irving M. Weiner; Robert M. Petrik; Joseph P. Carrier

[57] ABSTRACT

A volatile flux coating solution which, when dry, provides durable protective film coating containing residual flux, and a fluxing-soldering process utilizing such a solution. The coating solution is applied to a cleaned metal surface to be later joined and soldered to another metal surface, thereby obviating the need for recleaning and refluxing at the time of joining and soldering. Where two objects prepared according to this invention are joined, no additional cleaning or fluxing is required, thus saving significant time and labor at the work site. However, an object prepared according to the present invention may nevertheless be joined to an unprepared object at the work site if the unprepared object is prepared by conventional techniques, thereby allowing the prepared object to be joined with either prepared or unprepared objects. The soldering process is completed by soldering the two objects together according to conventional techniques.

32 Claims, 1 Drawing Sheet

PROCESS USING PROTECTIVE FLUX COATINGS FOR DELAYING JOINING AND SOLDERING OPERATIONS

This is a divisional of application Ser. No. 008,853 filed Jan. 30, 1987, now abandoned.

BACKGROUND OF THE INVENTION

1. Field of the Invention

The present invention relates to protective flux coatings and to a process for applying and utilizing such coatings. More particularly, the present invention relates to a process for applying protective flux coatings to cleaned metal surfaces for delaying joining and soldering operations and to the protective flux chemical solution incorporated therein.

2. Description of Relevant Art

The relevant art is described hereinbelow.

U.S. Pat. No. 3,960,614 issued in 1976 to Stayner, entitled "WAX-FLUX COMPOSITION CONTAINING A DIESTER OF SULFOMALEIC ACID FOR SOLDERING", discloses a wax-flux composition which is used in low-temperature soldering processes related to electronic components installed on a circuit board. The wax-flux composition is applied, while in molten form, to the metal pattern side of a circuit board fitted with electronic components. When hardened at room temperature, the wax-flux allows for the trimming and soldering of the component leads to the printed circuit board with a low-melting-point alloy solder.

U.S. Pat. No. 4,028,143 issued in 1977 to Stayner, et al., entitled "WAX-FLUX COMPOSITION CONTAINING A SUCCINIMIDE SALT OF AN ALKYLARYL SULFONIC ACID FOR SOLDERING", discloses a wax-flux composition for use in low-temperature soldering processes related to electronic components which is identical to the invention disclosed in Stayner, U.S. Pat. No. 3,960,614, discussed above, except for the utilization here of a wax-soluble succinimido salt of an alkylaryl sulfonic acid. The invention contains the salt to eliminate the staining of phenolic printed circuit boards caused by the slight amount of free sulfuric acid yielded by the preparation of sulfonic acid by oleum sulfonation.

U.S. Pat. No. 4,055,725 issued in 1977 to Boynton, entitled "CIRCUIT BOARD ASSEMBLY", discloses a material, which coats the electrically conductive metal laminated side of a circuit board for holding the components in place during the soldering process. The holding material, which is applied in a liquid state and hardens to form a solid, solder-compatible, non-metallic cement having a melting point below that of solder, is disclosed as a naturally occurring or synthetic wax which may have intermixed therewith flux active agents and/or wetting agents. The holding cement is melted and displaced simultaneously with soldering. The circuit board, once coated with the cement, may be placed in storage for future soldering.

U.S. Pat. No. 4,127,692 issued in 1978 to Boynton, entitled "JIG FOR MASS SOLDERING SYSTEM", discloses a process for preparing circuit boards utilizing, in part, a coating which acts as a jig to steady or stabilize the electronic components. The coating, which is either a naturally occurring or synthetic wax, may or may not include a compatible flux active agent. The board is coated with the wax or wax-flux combination and then the electrical and electronic components are loaded in position on the board with their leads extending through holes thereby embedding them into or through the coating. The coating, which holds the components, secures the components in such a way so that the component leads may then be trimmed to finish length and soldered in place. The invention further discloses that the board may be placed in storage for future soldering operations.

The wax-flux and wax-flux compositions of the known art disclose coatings for use in assembling electronic components which are solid at room temperature. However, such coatings are relatively thick and are not readily usable on metallic objects which are to be joined at close tolerances. Additionally, wax-flux and wax-flux compositions are, by their nature, untidy and may remain on a person's hand or clothing after contact. Because of the negative characteristics of wax-flux and wax-flux compositions, the present invention does not employ waxes or wax-like compounds, but is rather provided in alternate forms.

In addition to the wax-flux and related wax-flux compositions, there are known a variety of soldering fluxes and means of application. This variety includes paste, liquid, powder, and gaseous fluxes and integral solder/flux forms. Paste, liquid and gaseous fluxes are applied directly, while the powder form may be applied directly or applied after mixing with a fluid and forming a paste therefrom. Integral solder/flux, which comprises a solder material having an inner core of flux, is applied directly in a one-step operation at the time of joining. While the flux forms and methods of application of these fluxes differ, they share the common disadvantages of being generally untidy and non-durable. Because of these negative characteristics, these fluxed objects must be joined and soldered immediately, or almost immediately, thereby severely limiting the amount of time allowed to pass between preparation and joining.

The present invention effectively overcomes the problems and disadvantages attendant to conventional techniques.

SUMMARY OF THE INVENTION

The present invention provides a process for applying protective flux coatings to cleaned metal surfaces for delaying joining and soldering operations and the protective flux chemical solution incorporated therein. This fluxing-soldering process combines the steps of cleaning the surface of a metal object to be joined to another metal object and applying a flux coating solution to the cleaned metal surface which quickly dries to leave a durable film containing residual flux. The cleaned and coated objects may then be handled, assembled, shaped, formed or otherwise worked, packaged and unpackaged, stored and/or shipped without removal of the film or reduction of the coating and fluxing properties thereof. Thereafter, the coated object may be joined to another coated object without recleaning or refluxing. Additionally, an object cleaned and coated according to the present invention may be joined with an object cleaned and coated according to conventional techniques. In either case, the two objects may be fixed to one another according to conventional soldering techniques.

The flux coating solution is preferably comprised of rosin-containing flux solute and a volatile organic solvent.

One object of the present invention is to provide cleaned and coated objects to be joined and soldered which can be used immediately or stored for long periods prior to joining and soldering.

Another object of the present invention is to provide pre-cleaned and pre-fluxed objects which are joinable and solderable with other pre-cleaned and pre-fluxed objects without recleaning or refluxing.

Yet another object of the present invention is to provide pre-cleaned and pre-fluxed objects which are joinable and solderable with objects cleaned and fluxed according to conventional techniques.

Yet another object of the present invention is to minimize work time at the work site by eliminating cleaning and fluxing, thereby reducing field labor costs.

Still another object of the present invention is to eliminate the need for inconvenient and/or untidy liquid, paste, powder, or gaseous fluxes.

Another object of the present invention is to provide the application of a flux coating to a clean surface of an object at the time of its manufacture, thereby minimizing or eliminating the required steps of recleaning and fluxing the object in the future when joining is undertaken.

And still another object of the present invention is to provide cleaned and dry flux coated objects for joining and soldering which are thoroughly and consistently clean and which are coated, by means of a controlled process, with a uniform thickness of protective flux.

An additional object of the present invention is to provide a dry, protective coating which is clear, thereby enabling visual inspection of the surface at any time prior to joining and soldering.

Still another object of the present invention is to provide a flux film and process of application which may be used in the assembly of conventional water, fuel, plumbing, heating, cooling, and ventilating systems and system component parts and equipment in the construction of housing, offices, industrial facilities, mobile homes, ships, boats and recreational vehicles, including travel trailers and motor homes.

Yet a further object of the present invention is to clean parts such as tubing, valves, fittings, piping and heat exchange elements and to protect such parts with a dry, tidy, durable film containing residual flux at the time of manufacture by using efficient mechanical means (or automated machinery) normally available at the place of manufacture.

Another object of the present invention is to provide cleaned and flux-coated parts which may be assembled at a convenient place and time to form multi-pieced water, fuel, plumbing, heating, cooling, and/or ventilating system "fabrications" designed for repetitive application in multi-unit building structures.

A further object still of the present invention is to provide a thin, uniformly distributed flux film, thereby eliminating waste and unnecessary cleanup after the joining process is completed.

The above and further objects, features and advantages of the present invention will become apparent from the following detailed description of a preferred embodiment of the invention, when read in conjunction with the accompanying drawings.

DETAILED DESCRIPTION OF PREFERRED EMBODIMENTS

The accompanying drawings illustrate two cleaned and coated objects, in whole and in cross-section, prior to and after joining according to the invention.

By way of illustration and not limitation, there are shown two objects of a tubular shape, although the invention can be applied to any metallic objects each having a fluid channel defined through at least a portion thereof, and which require cleaning and fluxing prior to joining and soldering for effective fluid-tight and durable assembly of the objects.

Figure 1:
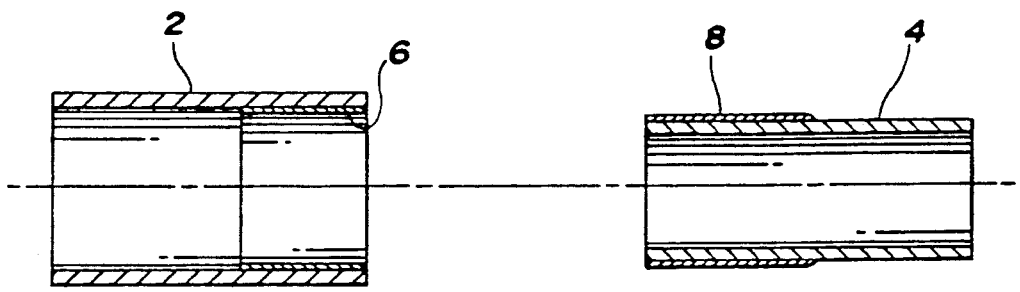
FIG. 1 illustrates a view in cross-section of two cleaned and dry flux coated objects according to the present invention which are prepared for joining and soldering.
Figure 2:
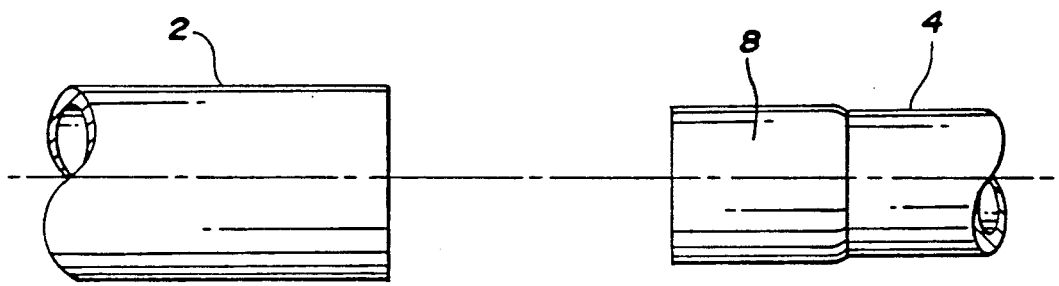
FIG. 2 illustrates the outer surface features of the objects of FIG. 1.

Referring now to FIGS. 1 and 2, there is shown a female object generally indicated by 2 and a male object generally indicated by 4 prior to assembly. The object shown is preferably, but not exclusively, tubular copper or copper alloy, as employed in conventional water, fuel, plumbing, heating, cooling, and ventilating systems. The shape of the material or its metallic composition can be varied according to the need while still being a candidate for application of this process and solution.

The joining surfaces of the objects selected for joining are cleaned by known cleaning processes which may include chemical or mechanical cleaning. Alternatively, the objects may be freshly manufactured and may not need the surfaces thereof to be cleaned. Effectively, it is only necessary to ensure that the joining surfaces of the objects are free of contaminants that would adversely affect the fluxing process. Once the surfaces to be joined are satisfactorily cleaned of all grease, oil, dirt, oxides, moisture and other contaminants, a chemical solution is applied to the surface of the joining and solder application faces which, according to the invention, is comprised of a flux solute and a volatile organic solvent. Concentrations of each part may be varied according to the need. Preferably, but not necessarily, the flux solute contains a rosin. Preferably, but not exclusively, the volatile organic solvent may be cyclohexanol or a chlorinated hydrocarbon capable of rapid evaporation such as, but not limited to, trichloroethylene. Once the volatile liquid of the solvent has evaporated, a thin, dry, durable and water resistant protective film containing residual flux remains on the cleaned surfaces to be joined. With reference to the illustrated objects, the film coats joining face 6 and joining and solder application face 8, as best illustrated in FIG. 1. Preferably, but not exclusively, the film on faces 6 and 8 is clear, thus allowing for convenient visual inspection to verify retained cleanliness at any time prior to joining of the surfaces. Optionally, a conventional activating reagent may be included in the solution prior to its application if an activated flux is desired.

After being prepared in the described manner, the cleaned and coated objects 2 and 4 may be handled, assembled, shaped, formed or otherwise worked, packaged and unpackaged, stored, and/or shipped without removal of the film from faces 6 and 8 or reduction of coating and fluxing properties.

Figure 3:
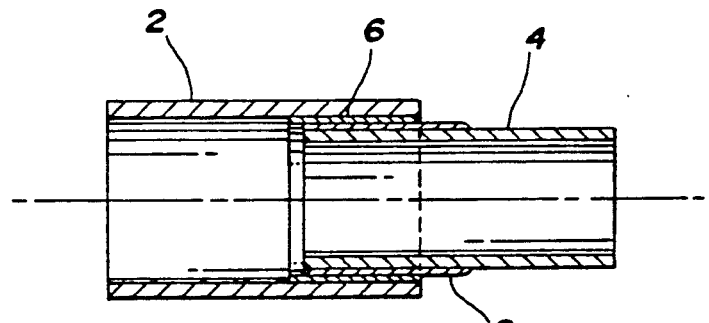
FIG. 3 illustrates a view in cross-section of the joined objects of FIG. 1.
Figure 4:
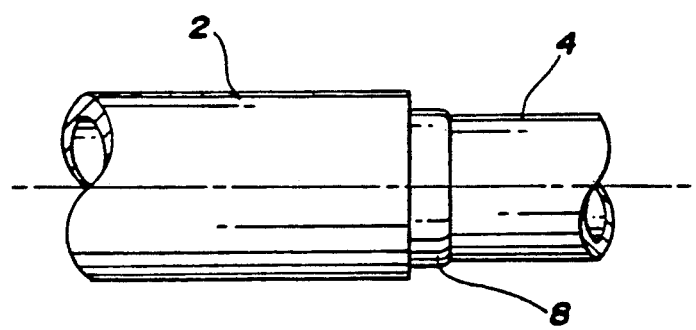
FIG. 4 illustrates the outer surfaces of the joined objects of FIG. 3.

Referring now to FIGS. 3 and 4, there is shown the female object 2 and male object 4 after joining. As can best be seen in FIG. 3, faces 6 and 8 are mated to one another at a very close tolerance. Once so mated, conventional soldering techniques are applied which preferably, but not exclusively, include applying heat (not shown) to female object 2, applying solder (not shown) to joining and solder application face 8, whereupon the greater portion of the flux film evaporates as the solder flows into the joint 10 between faces 6 and 8 and continues to flow after heat is removed because of capillary attraction. According to the present invention, the required coating may be predetermined and metered out to prevent wasted overflow, thus providing a significant economic and working advantage over known fluxes. Particularly, inasmuch as the flux film is substantially completely evaporated during the solder process and because there is no excess, overflowing solder, a conventionally required step of cleaning the joined objects is eliminated. Similarly, according to known techniques, the required solder may be metered out to prevent overflow. However, if overflowed solder and/or excess flux is present after heating it may be simply wiped away. The joint then cools, and the process is completed.

If any of the objects to be joined have not been pre-cleaned and pre-fluxed according to the process and chemical solution of the present invention, the unprepared objects may be cleaned and fluxed by conventional means at the work site. Accordingly, objects prepared according to the present invention may be joined to other similarly prepared objects or may be joined with objects prepared by conventional means.

The present invention is not restricted to the particular structure and examples described above and illustrated in the attached drawings. Various modifications and variations can be made in the described structure and flux solution by those skilled in the art without exceeding the scope of the invention as claimed hereinbelow.

We claim:

1. A process for preparing a metallic object having a fluid channel defined through at least a portion thereof so that the object can be fluid-tightly soldered to a mating metallic object at a later time without cleaning and fluxing the metallic object at the later time, the process comprising the steps of:
   providing a metallic object having a fluid channel defined through at least a portion thereof;
   ensuring that a surface of said portion is free of contaminants; and
   applying a flux coating solution including a flux solute and a volatile solvent to the portion of said object and permitting the solution to quickly air dry and leave a thin durable film containing residual flux on the surface of said portion so that said portion can be fluid-tightly soldered to a mating metallic object at a later time without cleaning and fluxing of the portion at the later time;
   said metal object having the dried, coated film thereon being capable of being subjected to handling, assembling, shaping, forming, working, packaging, storing, shipping, etc. without removal of said film or reduction of the film's coating and fluxing properties.

2. A flux-applicating process according to claim 1, wherein:
   said flux coating solution includes an activating reagent.

3. A flux-applicating process according to claim 1, wherein:
   said metal objects are copper.

4. A flux-applicating process according to claim 1, wherein:
   said metal objects are copper-alloy.

5. A flux-applicating process according to claim 1, wherein:
   said durable film is clear.

6. A process according to claim 1, wherein:
   said volatile solvent is a volatile organic solvent.

7. A flux-applicating process according to claim 6, wherein:
   said volatile organic solvent is a chlorinated hydrocarbon capable of rapid evaporation.

8. A flux-applicating process according to claim 7, wherein:
   said chlorinated hydrocarbon is trichloroethylene.

9. A flux-applicating process according to claim 6, wherein
   said volatile organic solvent is cyclohexanol.

10. A flux-applicating process according to claim 6, wherein:
    said flux solute contains rosin.

11. A soldering process for fluid-tightly joining metallic objects each having a fluid channel defined through at least a portion thereof, the process comprising the steps of:
    providing at least two metallic objects each having a fluid channel defined through at least a portion thereof, said portions being adapted to mate together with close tolerance;
    ensuring that mating surfaces of said portions are free of contaminants;
    applying a flux coating solution containing a flux solute and a volatile solvent to said portions of the metallic objects and permitting the solution to quickly air dry and leave a thin durable film containing residual flux on the mating surfaces of said portions so that the soldering process can be suspended until a later time;
    said coated portions of the metallic objects being capable of being subjected to handling, assembling, shaping, forming, working, packaging, storing, shipping, etc. without removal of said film or deduction of its coating and fluxing properties;
    mating the coated portions of the metallic objects together; and
    applying heat and solder to said mated portions to form a fluid-tight joint therebetween.

12. A fluxing-soldering process according to claim 11, wherein:
    said flux coating solution includes an activating reagent.

13. A fluxing-soldering process according to claim 11, wherein:
    said metal objects are copper.

14. A fluxing-soldering process according to claim 11, wherein:
    said metal objects are copper-alloy.

15. A fluxing-soldering process according to claim 11, wherein:
    said durable film is clear.

16. A fluxing-soldering process according to claim 11, wherein:
   said volatile solvent is a volatile organic solvent.

17. A fluxing-soldering process according to claim 16, wherein:
   said volatile organic solvent is a chlorinated hydrocarbon capable of rapid evaporation.

18. A fluxing-soldering process according to claim 17, wherein
   said chlorinated hydrocarbon is trichloroethylene.

19. A fluxing-soldering process according to claim 16, wherein:
   said volatile organic solvent is cyclohexanol.

20. A fluxing-soldering process according to claim 16, wherein:
   said flux solute contains rosin.

21. A fluxing-soldering process according to claim 11, wherein:
   a predetermined quantity of said solder is applied during said heating and soldering step so as to eliminate overflow and so that a conventional step of cleaning the joined objects is eliminated.

22. A cross-fluxing-soldering process for fluid-tightly joining metallic objects, each object having a fluid channel defined through at least a portion thereof, the process comprising the steps of:
   providing a first metallic object having a fluid channel defined through at least a portion thereof and ensuring that a surface of the portion is free of contaminants;
   applying a flux coating solution comprising a flux solute and a volatile solvent to the portion of said first metallic object and permitting the solution to quickly air dry and leave a thin durable film containing residual flux on the surface of said portion so that the soldering process can be suspended until a later time;
   the coated portion of said first metallic object being capable of being subjected to handling, assembling, shaping, forming, working, packaging, storing, shipping, etc. without removal of said film or reduction of the film's coating and fluxing properties;
   providing a second metallic object having a fluid channel defined through at least a portion thereof and ensuring that a surface of said portion is free of contaminants, the portions of the first and second metal objects being adapted to be mated together with close tolerance;
   applying a conventional flux to the portion of said second metal object;
   mating the portions of said first and second metal objects together; and
   applying heat and solder to the mated portions of said first and second metal objects to form a fluid-tight joint therebetween.

23. A cross-fluxing-soldering process according to claim 22, wherein:
   said flux coating solution includes an activating reagent.

24. A cross-fluxing-soldering process according to claim 22, wherein:
   said metal objects are copper.

25. A cross-fluxing-soldering process according to claim 22, wherein:
   said metal objects are copper-alloy.

26. A cross-fluxing-soldering process according to claim 22, wherein:
   said durable film is clear.

27. A cross-fluxing-soldering process according to claim 22, wherein:
   said volatile solvent is a volatile organic solvent.

28. A cross-fluxing-soldering process according to claim 27, wherein:
   said volatile organic solvent is a chlorinated hydrocarbon capable of rapid evaporation.

29. A cross-fluxing-soldering process according to claim 28, wherein:
   said chlorinated hydrocarbon is trichloroethylene.

30. A cross-fluxing-soldering process according to claim 27, wherein:
   said volatile organic solvent is cyclohexanol.

31. A cross-fluxing-soldering process according to claim 27, wherein:
   said flux solute contains rosin.

32. A cross-fluxing-soldering process according to claim 22, wherein:
   a predetermined quantity of said solder is applied during said heating and soldering step so as to eliminate overflow and so that a conventional step of cleaning the joined objects is eliminated.

* * * * *